May 17, 1927.  E. PENBERTHY  1,629,117
FLUID PRESSURE TOOL
Filed Jan. 27, 1925
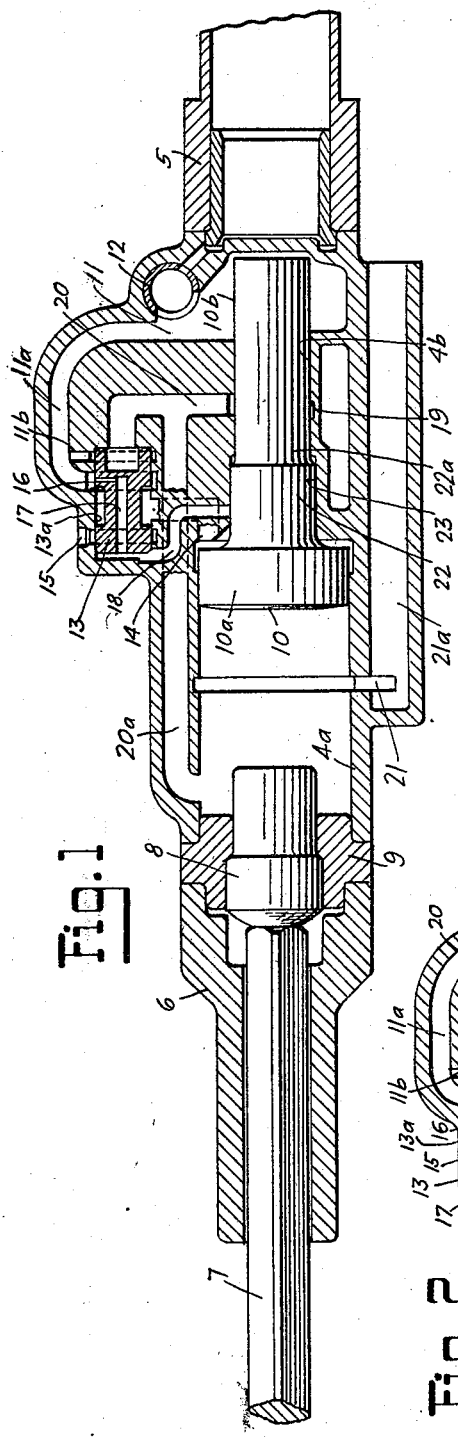
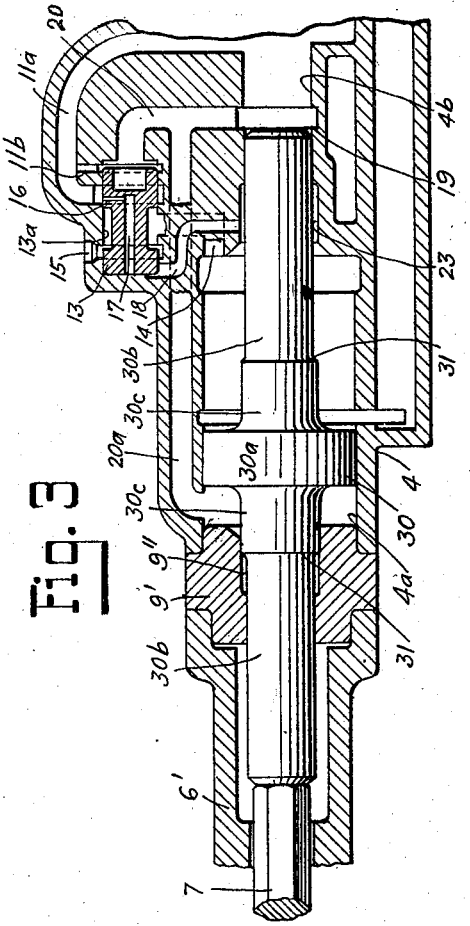
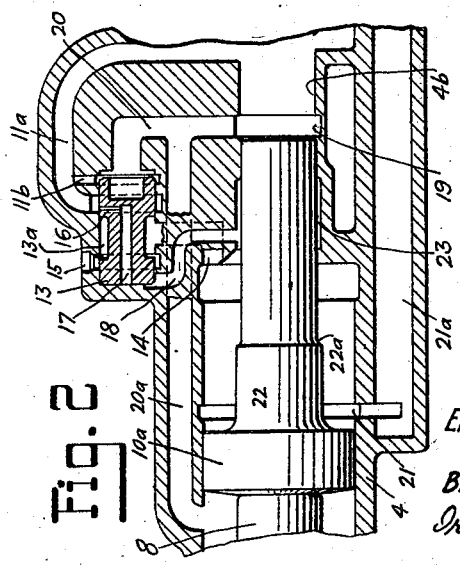
INVENTOR
Ernest Penberthy
BY *L.* ATTORNEY
Ira L. Nickerson Patented May 17, 1927.

1,629,117

UNITED STATES PATENT OFFICE.

ERNEST PENBERTHY, OF DETROIT, MICHIGAN, ASSIGNOR TO CHICAGO PNEUMATIC TOOL COMPANY, OF NEW YORK, N. Y., A CORPORATION OF NEW JERSEY.

FLUID PRESSURE TOOL.

Application filed January 27, 1925. Serial No. 5,005.

This invention relates to fluid pressure percussive tools of the type using a two-diameter piston. While such tools are of general utility they are particularly adapted for use in stoping or drilling upwardly inclined holes during mining operations. The present invention is in some respects an improvement on a previous invention disclosed in my co-pending application Serial No. 5002 filed of even date herewith.

Among the objects of the invention are to increase the piston speed of a drill of this type by providing a quick acting positive cushion for stopping the piston at the end of its stroke without striking the cylinder or head of the tool, to provide an improved form of two diameter piston for accomplishing the above object, and in general to improve prior devices in the interest of more efficient and satisfactory operation.

With these and other objects in mind the invention will now be described in detail reference being had to the accompanying drawings wherein is disclosed for the purpose of illustration certain preferred embodiments thereof.

In the drawings:

Fig. 1 is a longitudinal sectional view of so much of a stoping drill as is necessary to illustrate the invention.

Fig. 2 is a fragmentary sectional view similar to Fig. 1 showing the operative parts of the drill in a different position.

Fig. 3 is a fragmentary sectional view similar to Fig. 1 of a modified form of the invention the operative parts being shown in the position illustrated in Fig. 2.

In the embodiment of the invention disclosed in Figs. 1 and 2 the drill cylinder 4 is provided at its rear or back end with a feed cylinder 5 of any known or desired type and at its opposite end with a front head 6 forming a chuck for the shank of the drill bit or steel 7 which receives through an anvil 8 mounted in a guide member 9 interposed between head 6 and cylinder 4 the blows of the impact member or piston 10 of the drill.

As in my copending application above referred to cylinder 4 provides a two diameter piston chamber in which is disposed the two diameter piston 10 formed with a head $10^a$ fitting the large bore $4^a$ of the piston chamber and a rearwardly projecting stem $10^b$ fitting the small bore $4^b$ of the piston chamber. The stem end of the piston 10 is continuously subjected to the pressure of motive fluid admitted to the live air chamber 11 of the cylinder by the usual throttle valve 12. The second forward pressure area of the piston, namely the rear face of head $10^a$ has motive fluid admitted thereagainst and exhausted therefrom by an automatic control valve 13 reciprocating in a valve chamber $13^a$ in timed relation with the movements of the piston 10 and serving alternately to effect connection of passage 14 with the live air passage $11^a$ (Fig. 1) or with the auxiliary exhaust port 15 (Fig. 2). This valve, as in my copending application, is shifted rearwardly through the building up of pressure against the forward end thereof resulting from a continuous admission of motive fluid which building up occurs when the piston controlled vent passage 18 extending from said end of the valve is closed by the piston (Fig. 1); the valve is shifted in the opposite direction when the stem end of the piston on the forward stroke thereof uncovers the circumferential groove 19 in the small bore $4^b$ of the piston chamber (Fig. 2), from which groove extends a passage 20 to the rear end of the valve. A branch $20^a$ of passage 20 extends to the front end of the large bore $4^a$ of the piston chamber to admit motive fluid against the front face of piston head $10^a$ which serves as the return area for the piston. As in my copending application the rear head of the valve on its forward movement may uncover a branch passage $11^b$ from the live air passage $11^a$ for continuing the delivery of motive fluid to the front of the piston chamber after the stem of the piston has closed the admission groove 19 (Fig. 2). The piston head $10^a$ controls the usual main exhaust port or groove 21 which communicates with exhaust passage $21^a$ leading to atmosphere.

Since the cycle of operation of the drill as so far described is believed to be obvious and moreover is identical with that of a drill disclosed in my above identified copending application further description thereof is omitted.

By the combination of the auxiliary valve controlled exhaust for the rear face of the piston head $10^a$ together with the valve controlled means for delaying the cutoff of the motive fluid supply to the front or return pressure area of the piston after its stem has closed the usual admission groove 19, a full rearward stroke of the piston even against the constant live air pressure on the valve stem is insured. It is essential to the fast operation of the drill and to the prevention of damage to the latter by a possible striking of the piston that effective means be provided for positively and promply checking and reversing the piston at the end of its rearward stroke. Means for accomplishing this purpose, which comprises the present invention, will now be described. The stem 10$^b$ of the piston adjacent its connection with the head 10$^a$ is formed with an enlargement 22 providing a shoulder 22$^a$ adjacent stem 10$^b$ and this enlargement has a fluid tight sliding fit in counter bore 23 of the small bore 4$^b$ of the cylinder. With this arrangement the sealing or closing of the counter bore 23 by the enlargement 22 on the rear stroke of the piston traps air in the counter bore and forms a cushion chamber, the trapped and compressed air therein being effective against the shoulder 22$^a$ to stop the piston and reverse its movement. While it is within the purview of this invention to form the enlargement 22 as a narrow radial flange on stem 10$^b$ it is preferable to continue the enlargement to the head 10$^a$ of the piston as disclosed in the drawings and to dispose the vent passage 18 for the front end of the valve for control by this enlargement.

Since enlargement 22 makes a tight sealing fit with the counter bore 23, this disposition of the vent passage not only insures a tight seal of the same but makes for accurately timed shifting of the valve as the trapped and compressed air in the cushion chamber augments the continuously admitted stream of motive fluid from passage 16—17. Conversely continuously admitted air insures an ample air cushion in counterbore 23.

The invention further contemplates a reversible piston having the characteristics of the nonreversible piston just described. To this end a modification of the invention is shown in Fig. 3 wherein slight changes in the front head construction of the drill are required to accommodate the reversible piston. These changes are such as to provide if desired an air cushion for the piston on its forward stroke as well as its rearward stroke whereby the striking of the piston and possible damage to the front head construction of the drill is avoided in case the drill is inadvertently operated when the drill steel is not in place or is not pressed to the work. As shown the reversible piston 30 (Fig. 3) comprises a cylinder head portion 30$^a$ fitting the large bore 4$^a$ of the drill cylinder 4 with symmetrical disposed extensions on opposite sides of this head. These extensions comprise the enlargements 30$^c$ adjacent the head (corresponding to the enlargement 22 on piston 10) and projecting stem portions 30$^b$. The rearwardly disposed stem portion 30$^b$ reciprocates within the small bore 4$^b$ of the piston chamber and the rearwardly disposed enlargement 30$^c$ cooperates with the counterbore 23 in the piston chamber after the manner described in relation to the form of the invention shown in Figs. 1 and 2. The front stem portion 30$^b$ of the piston imparts the blows of the piston directly to the drill steel 7 supported in the front head 6' and reciprocates in the bore of a guide member 9' which is interposed between the front head 6' and cylinder 4 of the drill. Guide member 9' is counterbored at 9'' to receive forward enlargement 30$^c$ with a sliding fit, whereby an air cushion is formed for the front shoulder 31 of the piston. The counterbore 9'' of the guide member 9' is so disposed as not to interfere with the full blow of the piston and to produce the cushion chamber only when the piston moves forward to an undue extent as when there is no steel in the front head or when the steel is not pressed to the work. With the exception that the reversible piston strikes the drill steel directly and is cushioned and stoped only when it moves forward to an undue extent, the functioning of the reversible piston in the slightly modified form of drill shown in Fig. 3 is exactly the same as the functioning of the non-reversible piston shown in Figs. 1 and 2.

I claim as my invention:

1. In a fluid pressure tool, in combination, a cylinder having coaxial interconnected large and small bores, a piston formed with a head fitting the large bore and a stem fitting the small bore and arranged to be reciprocated in said cylinder, the small bore of said cylinder being counterbored to form a cushion chamber, and an enlargement on the stem of said piston for cooperation with said counterbore near the end of the piston stroke for cushioning the piston.

2. In a fluid pressure tool, in combination, a cylinder having coaxial interconnected large and small bores, a piston formed with a head fitting the large bore and a stem fitting the small bore and arranged to be reciprocated in said cylinder, the small bore of said cylinder being counterbored to form a cushion chamber, an enlargement on the stem of said piston for cooperation with said counterbore near the end of the piston stroke for cushioning the piston, and means admitting motive fluid to said counterbore.

3. In a fluid pressure tool, in combination, a cylinder having coaxial interconnected large and small bores, a piston formed with a head fitting the large bore and a stem fitting the small bore and arranged to be reciprocated in said cylinder, the small bore of said cylinder being counterbored to form a cushion chamber, an enlargement on the stem of said piston for cooperation with said counterbore near the end of the piston stroke for cushioning the piston, and a port controlled by said enlargement admitting motive fluid to said counterbore.

4. In a fluid pressure tool, in combination, a cylinder having a two diameter bore, a piston reciprocable in said bore and formed with a head and a projecting stem to fit said bore, a valve controlling the movements of said piston, an enlargement on said piston stem arranged to control the shifting of the valve in one direction, said cylinder having a counterbore for receiving said enlargement thereby forming a cushion chamber to check the movement of said piston.

5. In a fluid pressure tool, in combination, a cylinder having a two diameter bore, a piston reciprocable in said bore and formed with a head and a projecting stem to fit said bore, a symmetrical enlargement on the stem of said piston cooperating with a counterbore in the small bore of said cylinder to cushion the piston at the end of its stroke, a valve controlling the movements of said piston, and a passage admitting live air continuously to a pressure area of said valve, said passage terminating in a vent or relief port in said counterbore whereby on sealing of said counterbore by said enlargement an effective air cushion is provided by said continuously admitted live air, which live air is also caused to build up against said pressure area and shift said valve.

6. In a fluid pressure tool, in combination, a cylinder having coaxial interconnected large and small bores, the small bore having a counterbore adjacent the large bore, a piston reciprocable therein having a head fitting the large bore and a stem of uniform diameter fitting the small bore, means for venting the piston chamber rearwardly of said head on the back stroke of said piston, and means for cushioning said piston comprising an enlargement on said stem cooperating with said counterbore in said small cylinder bore.

7. In a fluid pressure tool, in combination, a cylinder having a two diameter bore, the small bore having a counterbore adjacent the large bore, a reversible piston reciprocable therein comprising a head with projections or stems extending from the opposite sides thereof, said stems having enlargements adjacent said head for cooperation with said counterbore in said cylinder for cushioning said piston at the end of its stroke.

8. In a fluid pressure tool, in combination, a cylinder having a two diameter bore, a reversible piston reciprocable therein comprising a head with projections or stems extending from the opposite sides thereof, said stem having enlargements adjacent said head, said cylinder having a counterbore at one end of the small piston bore thereof for cooperation with the rearwardly disposed enlargement to form a cushion chamber, and a guide for the front or impact stem of the piston, said guide having a counterbore for receiving the forwardly disposed enlargement thereby to form a cushion chamber.

9. A piston for fluid pressure percussive tools comprising a cylindrical head having a projection or stem extending from one face of said head, said stem being of uniform diameter throughout its length save for an enlargement extending radially therebeyond to form a cushion surface disposed transversely to the longitudinal axis of said piston.

10. A piston for fluid pressure percussive tools comprising a cylindrical head having projections or stems extending axially from the opposite faces of said head, an enlargement on one of said stems adjacent said head said enlargement providing a cushion surface disposed transversely to the longitudinal axis of said piston, said stems being of uniform diameter beyond said enlargements.

11. A reversible piston for fluid pressure percussive tools comprising a cylindrical head having projections or stems extending axially from the opposite faces of said head, and enlargements on both of said stems adjacent said head, said enlargements providing cushion surfaces disposed transversely to the longitudinal axis of said piston, said stems being of uniform diameter beyond said enlargements.

Signed by me at Detroit, Mich., this 21st day of January, 1925.

ERNEST PENBERTHY.